Patented Nov. 13, 1951

2,575,018

UNITED STATES PATENT OFFICE 2,575,018

PHOTOGRAPHIC SENSITIZING DYES COMPRISING A BENZOXAZOLE NUCLEUS

Grafton H. Keyes and Leslie G. S. Brooker, Rochester, N. Y., assignors to Eastman Kodak Company, Rochester, N. Y.

No Drawing. Application September 24, 1949, Serial No. 117,708

4 Claims. (Cl. 260—240.4)

This invention relates to photographic sensitizing dyes comprising a benzoxazole nucleus. More particularly this invention relates to merocyanine dyes containing a benzoxazole nucleus and a rhodanine nucleus.

Many dyes of the merocyanine class are characterized by their lack of sufficient solubility in the solvents useful in the preparation of photographic materials or emulsions to justify their use. This lack of sufficient solubility has been acknowledged as a serious disadvantage (see, for example, Schwarz "Phot. Korr." 1937, 73, Beilage to No. 5), and efforts have been made to increase the solubility of these dyes.

Merocarbocyanine dyes containing a benzoxazole nucleus and a rhodanine (2-thio-2,4(3,5)-thiazoledione) nucleus exhibit sensitizing properties, which suggest that such dyes might be useful in the preparation of photographic, silver-halide emulsions. However, these dyes are among those noted above which are characterized by a lack of the solubility requisite for photographic use. We have now found that merocarbocyanine dyes containing a benzoxazole nucleus and a rhodanine nucleus can be solubilized by the introduction of certain groups into these dyes.

It is, therefore, an object of our invention to provide new solubilized merocarbocyanine dyes. Another object is to provide means for preparing these dyes. A further object of our invention is to provide photographic emulsion containing these new merocarbocyanine dyes and a method for obtaining these emulsions. Other objects will become apparent upon a consideration of the following description.

According to our invention we provide new merocarbocyanine dyes selected from those represented by the following general formula:

I. 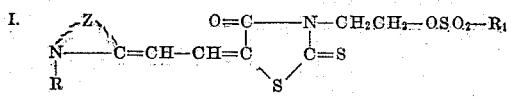

wherein R represents a primary alkyl group, e. g. methyl, ethyl, n-propyl, n-butyl, isobutyl, etc. groups (i. e. a primary alkyl group of the formula $C_nH_{2n+1}$ wherein $n$ represents a positive integer from 1 to 4), $R_1$ represents an aromatic nucleus of the benzene series, such as phenyl, o-, m- and p-tolyl, 2,3-dimethylphenyl, 2,4-dimethylphenyl, 2,5-dimethylphenyl, etc. groups (e. g. an aromatic hydrocarbon nucleus of the benzene series, especially those groups containing from 6 to 7 carbon atoms), and Z represents the non-metallic atoms necessary to complete a heterocyclic nucleus of the benzoxazole series.

We prepare the dyes represented by Formula I above by reacting a compound selected from those represented by the following general formula:

II. 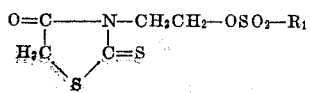

wherein $R_1$ has the values set forth above, with a compound selected from those represented by the following general formula:

III. 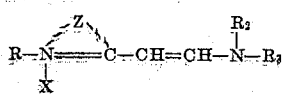

wherein R and Z have the values set forth above, $R_2$ represents a hydrogen atom, an alkyl group, such as methyl, ethyl, etc. groups (e. g. an alkyl group containing from 1 to 2 carbon atoms), or an acyl group of a carboxylic acid, e. g. acetyl, propionyl, benzoyl, etc. groups (e. g. an acyl group of a carboxylic acid containing from 2 to 6 carbon atoms), $R_3$ represents an aromatic group, such as phenyl, o- and p-tolyl, diphenyl, naphthyl, etc. groups, e. g. an aromatic hydrocarbon group, especially an aromatic hydrocarbon nucleus of the benzene series) and X represents an anion (i. e. an acid radical), such as halide (e. g. chloride, iodide, bromide, etc.), perchlorate ($ClO_4^-$), thiocyanate ($SCN^-$), acetate ($CH_3COO^-$), arylsulfonate, e. g. benzenesulfonate (), p-toluenesulfonate $$(CH_3C_6H_4\text{—}SO_3^-)$$

alkylsulfate, e. g. methylsulfate ($CH_3OSO_3^-$), ethylsulfate ($C_2H_5OSO_3^-$), etc.

The intermediates represented by Formula II above can be prepared as hereinafter set forth. The intermediates represented by Formula III above are well known and have been previously described in numerous periodicals and patents. (See, for example, British Patent 344,409, accepted March 4, 1941; Brooker U. S. Patent 2,078,233, dated April 27, 1937; etc.)

The condensation can be carried out in the presence of a basic condensing agent, i. e. an acid-binding agent, e. g. trialkyl amines, such as triethylamine, tri-n-propylamine, triisopropylamine, tri-n-butylamine, etc.; heterocyclic amines, such as N-alkylpiperidine, e. g. N-methyl- and N-ethylpiperidine, etc. Alkali metal alcoholates, e. g. sodium methoxide, potassium ethoxide, etc. can also be used. Tertiary amine condensing agents are especially useful in practicing our invention.

Heat accelerates the reaction, and temperatures varying from about 25° C. to the reflux temperature of the reactants can be used.

The condensation can be carried out in the presence or absence of an inert diluent, if desired. Typical diluents include, for example, the lower aliphatic alcohols (i. e. one to four carbon atoms), such as ethyl, n-propyl, isopropyl, etc. alcohols, pyridine, quinoline, etc. The diluent should be inert toward the dyes, and is advantageously chosen so that the dye formed will separate therefrom, at least upon cooling the reaction mixture.

The following example will serve to illustrate more fully the manner whereby we practice our invention.

*Example 1.*—5 - [(3 - ethyl - 2(3) - benzoxazolylidene]-3-[β-(p-tolylsulfonyloxy) ethyl]rhodanine

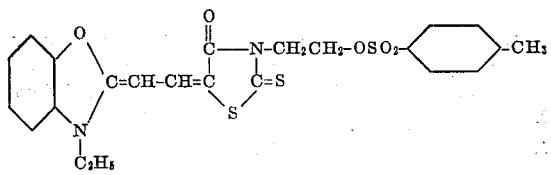

3.3 g. (1 mol.) of 3-[β-(p-tolylsulfonyloxy)-ethyl]rhodanine, 4.35 g. (1 mol.) of 2-β-acet-anilidovinylbenzoxazole ethiodide, 25 cc. of ethyl alcohol and 1 g. (1 mol.) of triethylamine were heated together under reflux for 15 minutes. The desired dye separated on chilling the reaction mixture, which was then filtered, and washed with chilled methyl alcohol. After recrystallization from methyl alcohol, the dye was obtained as light brownish crystals melting at 158°–160° C.

Operating in a manner similar to that illustrated above, other dyes selected from those represented by Formula I can be obtained. For example, condensing one molecular equivalent of β-anilinovinylbenzoxazole butobromide with one molecular equivalent of 3-β-benzenesulfonyloxyethylrhodanine gives the dye represented by the following formula:

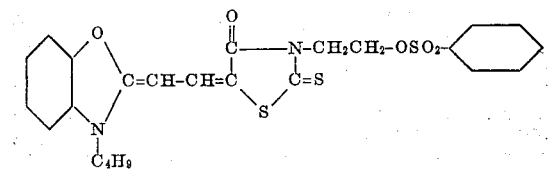

The benzoxazole nucleus can have substituted thereon various groups, such as chloride, bromide, methoxyl, ethoxyl, hydroxyl, etc. groups.

The following example illustrates one method for preparing the intermediates represented by Formula II above.

*Example 2.*—3-[β-(p-tolylsulfonyloxy)-ethyl]rhodanine

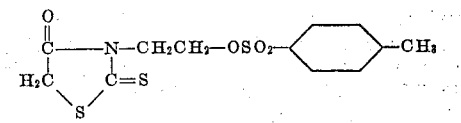

17.7 g. (1 mol.) of 3-β-hydroxyethylrhodanine were dissolved in 75 cc. of dry pyridine and the solution chilled to 5° C. While the chilled solution was stirred with the aid of a mechanical stirrer, 19 g. (1 mol.) of p-toluenesulfonyl chloride was added. The temperature quickly rose to about 50° C., but in about 10 minutes' time the temperature had dropped to around 10° C. The cool solution was stirred for an hour, and 75 cc. of water were then added in small portions, care being taken to keep the temperature below 20° C. When the solution was made acid to Congo red, a sticky product separated. This product was taken up in ether and the solution dried over magnesium sulfate. The dried solution was then evaporated to dryness, leaving the desired product in the form of a viscous oil.

Operating in a manner similar to that illustrated above, other arylsulfonyl halides can be reacted with 3-β-hydroxyethylrhodanine to give other intermediates coming within the scope of Formula II above. Among such arylsulfonyl halides are p-toluenesulfonyl bromide, benzenesulfonyl chloride, o-xylene-3-sulfonyl chloride, o-xylene-4-sulfonyl chloride, m-xylene-2-sulfonyl chloride, m-xylene-4-sulfonyl chloride, p-xylene-2-sulfonyl chloride, etc. The 3-β-hydroxyethylrhodanine and arylsulfonyl halide are advantageously employed in substantially equimolecular amounts.

The new dyes of our invention represented by Formula I above can alternatively be prepared by reacting a merocarbocyanine dye selected from those represented by the following general formula:

IV. 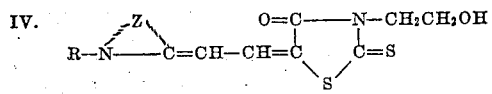

wherein R and Z have the values set forth above, with an arylsulfonyl halide selected from those listed above in the presence of a hydrohalide acceptor, i. e. an acid-binding agent, such as pyridine, quinoline, isoquinoline, N-alkylpiperidines (e. g. N-methl- and N-ethylpiperidines, etc.), etc. This method is generally less advantageous than that set out above in that the reaction mixture is difficult to separate to give the desired product in substantially pure form.

The intermediates represented by Formula IV above can advantageously be prepared by condensing in the presence of a basic condensing agent a compound selected from those represented by Formula III above with 3-β-hydroxyethylrhodanine. Such a process is described in Brooker et al. U. S. Patent 2,078,233 noted above.

The new merocarbocyanine dyes of our invention represented by Formula I above are characterized by their solubility in many of the solvents useful in the preparation of photographic, silver-halide emulsions, a property which is not generally shared by the corresponding merocarbocyanine dyes containing a β-hydroxyethyl or ethyl group in the position occupied by the arylsulfonyloxyethyl group of the dyes of Formula I. The dyes of our invention provide spectral sensitization of photographic, silver-halide emulsions analogous to these insoluble or sparingly soluble dyes (e. g. those of Formula IV), but possess the desirable property of being readily soluble in many of the solvents useful in preparing such photographic emulsions.

All of the dyes of our invention are particularly useful in manufacturing photographic, silver-halide emulsions, serving to alter the sensitivity thereof. Sensitization by means of our new dyes is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Methanol has proven satisfactory as a solvent for the majority of our new dyes.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

What we claim as our invention and desire secured by Letters Patent of the United States is:

1. A polymethine dye selected from those represented by the following general formula:

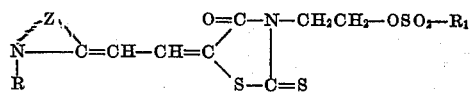

wherein R represents a primary alkyl group of the formula $C_nH_{2n+1}$ wherein $n$ is a positive integer from 1 to 4, $R_1$ represents an aromatic nucleus of the benzene series and Z represents the non-metallic atoms necessary to complete a heterocyclic nucleus of the benzoxazole series.

2. The polymethine dye represented by the following formula:

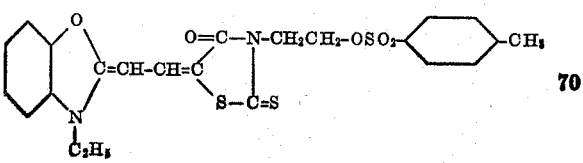

3. A process for preparing a polymethine dye comprising condensing in the presence of a tertiary amine-condensing agent a compound selected from those represented by the following general formula:

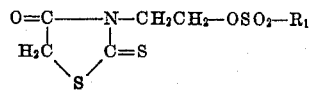

wherein $R_1$ represents an aromatic nucleus of the benzene series, with a compound selected from those represented by the following general formula:

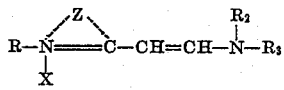

wherein R represents a primary alkyl group of the formula $C_nH_{2n+1}$ wherein $n$ is a positive integer from 1 to 4, $R_2$ represents a member selected from the group consisting of a hydrogen atom, an alkyl group containing from 1 to 2 carbon atoms and an acyl group of a carboxylic acid, $R_3$ represents an aromatic nucleus of the benzene series, Z represents the non-metallic atoms necessary to complete a heterocyclic nucleus of the benzoxazole series and X represents an anion.

4. A process for preparing 5-[(3-ethyl-2(3)-benzoxazolylidene] - 3 - [β-(p-tolylsulfonyloxy)-ethyl]rhodanine represented by the following formula:

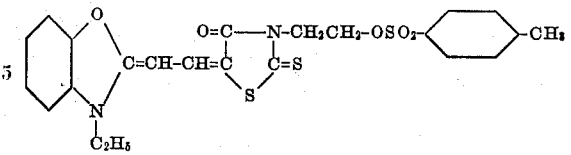

comprising condensing in the presence of triethylamine the compound represented by the following formula:

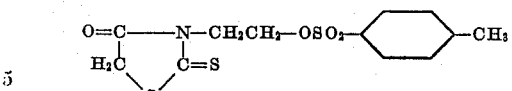

with the compound represented by the following formula:

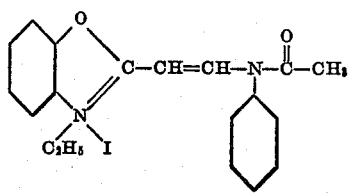

GRAFTON H. KEYES.
LESLIE G. S. BROOKER.

REFERENCES CITED

The following references are of record in the file of this patent:

UNITED STATES PATENTS

| Number | Name | Date |
| --- | --- | --- |
| 2,078,233 | Brooker | Apr. 27, 1937 |
| 2,170,805 | Brooker | Aug. 29, 1939 |
| 2,453,738 | Anish | Nov. 16, 1948 |
| 2,454,629 | Brooker | Nov. 23, 1948 |